Nov. 19, 1940.   W. J. SMITH   2,222,378
BRAKE AND ACCELERATOR CONTROL
Filed Jan. 21, 1939
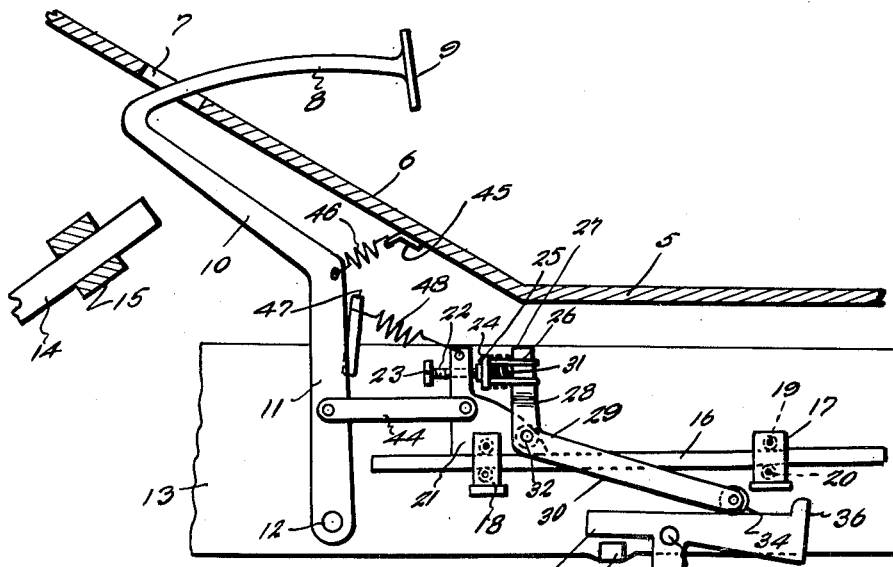
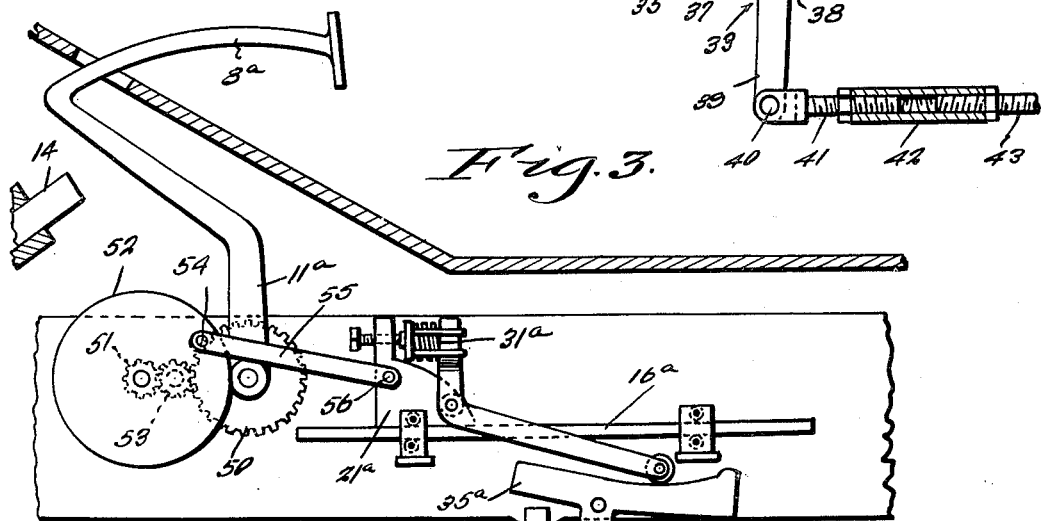
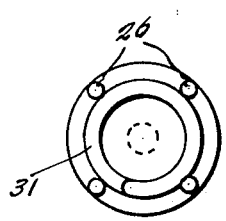
Inventor
William J. Smith
By Clarence A. O'Brien
and Hyman Berman
Attorneys Patented Nov. 19, 1940

2,222,378

UNITED STATES PATENT OFFICE 2,222,378

BRAKE AND ACCELERATOR CONTROL

William J. Smith, Delaware City, Del.

Application January 21, 1939, Serial No. 252,238

8 Claims. (Cl. 188—167)

This invention appertains to new and useful improvements in means for controlling the accelerator and brakes of a motor vehicle.

The principal object of the present invention is to provide a control of the above-stated character which will utilize a single pedal for controlling both the accelerator and brakes of a vehicle in a smooth-acting and fool-proof manner.

Another object of the invention is to provide a single pedal for controlling both the accelerator and brakes of a vehicle through the agency of mechanism which will permit the accelerator to be operated by actuation of the pedal in one direction and gradual application of the brakes by releasing the pedal in the opposite direction.

Still another important object of the invention is to provide a control for the accelerator and brakes of a vehicle wherein a single pedal is employed in conjunction with mechanism which will permit the pedal to be freely operated in one direction for controlling the accelerator and which involves force applying means to urge the pedal in the opposite direction as foot pressure is released from the pedal to effect a gradual application of the brakes.

A further object of the invention is to provide a control mechanism of the character stated wherein the parts are positive acting and not susceptible to the ready development of defects.

Numerous other important objects and advantages of the invention will become apparent to the reader of the following specification:

In the drawing:

Figure 1 represents a fragmentary vertical sectional view through the floor and toe boards of a conventional automobile structure, showing in side elevation the control mechanism.

Figure 2 is a rear end elevational view of the main spring and guide therefor.

Figure 3 is a fragmentary vertical sectional view through the floor and toe boards of a conventional automobile structure, showing the mechanism in side elevation.

Referring to the drawing wherein like numerals designate like parts, it can be seen in Figure 1 that numeral 5 represents the usual floor board while numeral 6 denotes the toe board having the opening 7 therein through which the shank 8 of the pedal 9 operates. Below the toe board 6 the pedal shank has the rearwardly extending portion 10 which merges with the depending leg portion 11 pivotally secured as at 12 to the vehicle frame 13.

The throttle valve is operated by a push rod 14 slidable through the guide 15, the contact end of this rod 14 terminating below the shank portion 10.

An elongated slide 16 is slidably disposed through the guides 17 and 18 which are suitably mounted or stationarily connected to the frame 13, and in each of these guides is an upper roller 19 and a lower roller 20 between which the slide 16 anti-frictionally operates.

A web 21 rises from the forward end portion of the slide 16 and has the adjusting screw 22 feedable horizontally through the upper portion thereof, this screw having a wrench-engageable head 23 and a pressure plate 24, the latter being operative against the follower plate 25. This follower plate has a plurality of rods 26 extending therefrom and these rods at their rear ends embrace the head portion 27 of the upper leg 28 of the rocker 29. This rocker is in the form of a bell crank and encloses the lower leg 30.

A main spring 31 is confined within the compass of the guide rods 26 and has one end bearing against the follower plate 25 and its opposite end impinging the head 27 of the bell crank. The action of the main spring 31 is to move the leg 28 rearwardly to swing the bell crank 29 on its fulcrum 32, to the end that its lower leg 30 will be urged downwardly to exert pressure against the T lever generally referred to by numeral 33, by having its roller 34 engaged with the straight top surface of the head bar 35 of the T lever. The head bar 35 gradually increases in width toward its rear end, at which end an upstanding stop or boss 36 is located. Protruding from the frame 13 is the stop lug 37 in the path of the forward end of the head bar 35 to prevent the head bar from swinging downwardly on the fulcrum 38 below a horizontal position.

From the fulcrum point 38 of the head bar 35 depends the leg 39, which at its lower end is pivotally connected as at 40 to the stub screw 41. A sleeve 42 having internal right and left-handed threads serves to receive the rear end of the stub screw 41 and the forward end of the brakes operating rod 43.

Still referring to Figure 1, it can be seen that numeral 44 represents a link connection between the intermediate portion of the pedal leg 11 and the web 21. A lug 45 is provided on the underside of the toe board 6 and between this and the upper end of the pedal leg 11 is the tensile spring 46. A lug 47 is provided on the frame 13 and between this and the uppermost portion of the web 21 is the tensile spring 48.

In the operation of this control, it can be seen that when the pedal 9 is pressed forwardly the shank portion 10 in bearing against the upper end of the accelerator rod 14 will control acceleration and in this position of the pedal 9, the roller 34 is bearing on the head bar 35 of the T lever 33, forwardly of the fulcrum point 38. In this position of the mechanism the brakes are held in disengaged position while the vehicle driver is engaged in controlling the acceleration of the vehicle to any extent desired.

However, when the driver releases his foot pressure so that the spring 46 moves the pedal 9 rearwardly, the link 44 will force the slide 16 and its web 21 rearwardly, moving the roller 34 to a point rearwardly of the fulcrum 38. As soon as the roller 34 starts to progress rearwardly of the fulcrum 38 the tensional effect of the main spring 31 begins to rock the bell crank 29 and responsively, the T lever 33. As the T lever is rocked the leg 39 thereof moves forwardly, exerting a pull on the brake-operating rod 43 with the result that the brakes are operated and this operation, that is, specifically the pull on the rod 43 is determined in the amount of force by the position to which the pedal 9 is released. The pedal, as shown in Figure 1, has been only partly released as the roller 34 is at a position only about midway between the fulcrum 38 and the stop 36.

The relationship of the spring 48 to the spring 46 is such that tensioning of the spring 48 will not take place until the mechanism has been moved by the spring 46 to dispose the roller 34 on the head bar 35 rearwardly of the fulcrum 38. Obviously, the tension of the main spring 31 is governed by regulation of the set screw 22.

The spring 46 must necessarily be weak in order not to tire the operator when he is controlling the vehicle by means of the accelerator. It is advisable, therefore, that the energy of the spring be almost spent by the time the force exerting unit, through the roller 34, has passed the fulcrum point. The tendency of the force exerting unit to ride farther out on the arm is due to the rocking of the arm, so that, as a matter of fact, the effort is reduced, due to the downhill movement in action of the force exerting means as a result of the rocking action of the rocker. In this connection, it is absolutely necessary that the track be smooth so as to reduce friction to the very minimum.

The second form of the invention is shown in Figure 3, and as regards the slide 16, the main spring and its mounting, and the web 21, the mechanism is as disclosed in Figure 1. However, in describing Figure 3 reference will be made to the slide 16 by reference character 16a, to the web 21 by reference character 21a, and to the main spring 31 by reference character 31a. Further, reference will be made to the T lever by reference character 33a and to its head bar and leg by reference characters 35a and 39a.

In this form of the invention shown in Figure 3, the leg 11a of the shank 8a is attached to the gear wheel 50. The gear wheel 50 drives the pinion 51 carrying the disk 52, through an intermediate pinion 53. Pivotally and eccentrically connected as at 54 is the forward end of the link 55, which link is pivotally connected at its rear end, as at 56, to the web 21a. In this form of the invention the top surface of the head bar 35a is preferably of longitudinally arcuate shape to partially offset the deflection of the head bar when brakes are applied.

The deflection of the head bar from a horizontal position causes head bar to have a slope which allows the main spring 31 to exert a force driving the control pedal 9 and balance of the unit rearwardly, which force has to be overcome by the operator when releasing the brakes. It is for this purpose that the spring 48 in form #1 and the arcuate shaped head bar are incorporated in the invention.

By so locating the stop 37 so that the track portion of lever 35 does not quite assume a horizontal position when the roller of bell crank 29 is located at the left of pivot point (during acceleration control) the spring 46 could be eliminated.

Obviously the mechanism is operated in substantially the same manner excepting that the drive from the pedal 9 is through the gears 50, 53 and 51 to the disk 52 and from the disk 52 by way of the link 55 to the web 21a.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A brake-operating mechanism comprising a movable lever having a brake line connected leg, and a controllable force-applying structure operative against the movable lever to swing the brake line attached leg to brake-applying position, said lever and its leg being of a substantial T-shape and rockably mounted.

2. A brake-operating mechanism comprising a movable lever having a brake line connected leg, and a controllable force-applying structure operative against the movable lever to swing the brake line attached leg to brake-applying position, said lever and its leg being rockably mounted, and stop means limiting rocking motion of the lever to a direction operating the leg to brake applied position.

3. In combination with a brake pedal, a movable lever including a leg, a brake line connection to the leg of the lever, and force-exerting means bearing against the track portion of the lever to move the lever and its leg to brake line operated position, said lever being rockably mounted, with its fulcrum at an intermediate point of the track portion of the lever.

4. In combination with a brake pedal, a movable lever including a track portion, a brake line connection to the leg portion of the lever, and force-exerting means bearing against the track portion of the lever to move the lever and its leg to brake line operated position, said lever being rockably mounted, said force-exerting means including a substantially bell crank-shaped structure having one end against the head of the lever, and force applying means for the opposite end of the bell crank structure disposed to cause rocking of the lever when the first-mentioned end of the bell crank structure is disposed against the lever at one side of its fulcrum point.

5. In combination with a brake pedal, a movable lever including a track portion, a brake line connection to the leg portion of the lever, and force-exerting means bearing against the track portion of the lever to move the lever and its leg to brake line operated position, and a manually operative member for shifting the force-exerting means to change the leverage effect of the said lever on the brake line, and spring means associated with said manually operative member for normally urging the force-exerting means to a position with respect to the lever effecting the greatest leverage throw thereof.

6. In combination with a brake pedal, a movable lever including a track portion, a brake line connection to the leg portion of the lever, and force-exerting means bearing against the track portion of the lever to move the lever and its leg to brake line operated position, said force-exerting means being slidably mounted and manually releasable spring means for sliding said force-exerting means to change the leverage throw of the said lever.

7. A brake operating mechanism comprising a movable lever having a brake line connected leg, and a controllable force applying structure, said lever having a longitudinally arcuate track portion against which the force applying structure is operative and ridable, said force applying structure including spring means operative on the track for a substantial length of the track without actuating said lever.

8. A brake mechanism including a control pedal, a force-applying means and a movable brake connected lever, a first portion of said movable lever adapted to carry said force-applying means to secure braking effect and a second portion of said movable lever adapted to carry said force-applying means where no braking action is accomplished, and means between the control pedal and force-applying means operatively connecting the same, said force-applying means adapted to assume brake applying position normally without foot pressure on said control pedal.

WILLIAM J. SMITH.